United States Patent
Seewald et al.

(10) Patent No.: US 6,538,840 B1
(45) Date of Patent: Mar. 25, 2003

(54) AUTOMATIC METHOD FOR OPTIMIZING THROUGHPUT IN A DISC DRIVE

(75) Inventors: Douglas L. Seewald, Norman, OK (US); Jack A. Mobley, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/552,744

(22) Filed: Apr. 19, 2000

Related U.S. Application Data
(60) Provisional application No. 60/141,624, filed on Jan. 30, 1999.

(51) Int. Cl.[7] ............................................... G11B 5/596
(52) U.S. Cl. ................................. 360/78.06; 360/73.02
(58) Field of Search ......................... 360/78.06, 78.04, 360/78.09, 73.02

(56) References Cited

U.S. PATENT DOCUMENTS

| | | | | |
|---|---|---|---|---|
| 4,907,109 A | * | 3/1990 | Senio ....................... | 360/78.04 |
| 5,164,838 A | * | 11/1992 | Okuda ....................... | 386/19 |
| 5,245,597 A | * | 9/1993 | Lee et al. ................. | 369/44.28 |
| 5,276,569 A | * | 1/1994 | Even ....................... | 360/73.02 |
| 5,847,895 A | * | 12/1998 | Romano et al. ......... | 360/78.09 |
| 6,031,683 A | * | 2/2000 | Iverson et al. ........... | 360/78.04 |
| 6,031,684 A | * | 2/2000 | Gregg ..................... | 360/78.06 |
| 6,115,205 A | * | 9/2000 | Waugh et al. ........... | 360/78.06 |
| 6,166,876 A | * | 12/2000 | Liu .......................... | 360/78.04 |
| 6,256,163 B1 | * | 7/2001 | Schmidt et al. .......... | 360/78.09 |

* cited by examiner

Primary Examiner—David Hudspeth
Assistant Examiner—Fred F. Tzeng
(74) Attorney, Agent, or Firm—Kirk A. Cesari

(57) ABSTRACT

A disc drive includes a base and a disc rotatably attached to the base. The disc drive also includes an actuator assembly rotatably attached to said base and a device for moving the actuator assembly. The actuator assembly includes a transducer head in a transducing relationship with respect to the disc. The disc drive includes a disc drive controller for controlling movement of the actuator during track follow and track seek operations. The disc drive controller computes a phase difference time when a command is generated to complete a seek. When a seek is performed, the disc drive controller computes the phase difference time. Then the controller monitors the actual seek time, and adjusts the phase difference time based on a comparison of the actual seek time with the computed phase difference time.

15 Claims, 4 Drawing Sheets

AUTOMATIC METHOD FOR OPTIMIZING THROUGHPUT IN A DISC DRIVE

RELATED APPLICATION

This application claims the benefit of U.S. Provisional Application Ser. No. 60/141,624, filed Jun. 30, 1999 under 35 U.S.C. 119(e).

FIELD OF THE INVENTION

The present invention relates to the field of mass storage devices. More particularly, this invention relates to a method of automatically maximizing throughput in a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer head to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer head is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of disc drive. Servo feedback information is used to accurately locate the transducer head. The actuator assembly is moved to the required position and held very accurately during a read or write operation using the servo information.

The actuator is rotatably attached to a shaft via a bearing cartridge which generally includes one or more sets of ball bearings. The shaft is attached to the base and may be attached to the top cover of the disc drive. A yoke is attached to the actuator. The voice coil is attached to the yoke at one end of the rotary actuator. The voice coil is part of a voice coil motor which is used to rotate the actuator and the attached transducer or transducers. A permanent magnet is attached to the base and cover of the disc drive. The voice coil motor which drives the rotary actuator comprises the voice coil and the permanent magnet. The voice coil is attached to the rotary actuator and the permanent magnet is fixed on the base. A yoke is generally used to attach the permanent magnet to the base and to direct the flux of the permanent magnet. Since the voice coil sandwiched between the magnet and yoke assembly is subjected to magnetic fields, electricity can be applied to the voice coil to drive it so as to position the transducers at a target track.

Quick and precise positioning requires the reduction of the vibration of the magnetic disc apparatus caused by the driving reaction force to the voice coil motor. What is needed is a disc drive which has is less susceptible to the reaction forces. This will improve settling characteristics after a seek from a first track on the disc to a target track on the disc and will improve track following operations of the disc drive. In other words, there is a need for a disc drive that has less relative motion between the actuator assembly and the base while under any type of servo control that requires corrections to be implemented with the voice coil motor. There is also a need for a static solution so that the resulting disc drive is more reliable over the life of the drive. Also needed is a device that can be assembled using current assembly techniques.

One constant goal associated with disc drives is to decrease or lessen the access time to data. Increasing the speed at which data can be retrieved is very desirable in a disc drive. The decrease in access time increases the speed at which a computer system can perform operations on data. When a computer is commanded to perform an operation on data or information that needs to be retrieved, the time necessary to retrieve the data from the disc is generally the bottleneck in the operation. When data is accessed more quickly, more transactions can generally be handled by a computer in a particular unit of time.

Most of the methods for controlling access time include referring to a velocity profile. A velocity profile is a preprogrammed equation or table which lists a desired velocity verses the stopping distance remaining until reaching the target track. In other words, a velocity profile provides the velocity the transducer head should have at varying distances from the destination or target track and, at each of a succession of tracks terminating with the destination or target track. Generally, the profile velocity value is the highest possible value of velocity the actuator can have at a particular remaining distance to allow the actuator to be decelerated to a stop upon reaching the destination or target track. Of course, there may be factors, such as power savings, that may steer designers away from following the highest possible velocity.

The velocity profile is shaped with respect to the number of tracks remaining in a seek to cause the transducer head to initially accelerate toward the destination or target track and subsequently decelerate to the destination or target track. In long seeks, these stages of the seek may be separated by a stage in which the transducer head traverses a series of tracks at a maximum speed that is selected on the basis of any of a number of criteria used by the manufacturer of the disc drive. For example, the maximum speed may be chosen to be the maximum speed the transducer head can attain with the power supply that is used to operate the servo system. A control signal is provided to the power amplifier that is directly proportional to the difference between the profile velocity and the actual velocity of the transducer head.

A typical seek is accomplished using closed loop control. The distance left to go to the destination or target track is determined and then the corresponding velocity from the velocity profile is selected. The difference between the actual actuator velocity and profile actuator velocity is provided to the servo controller. This value is then multiplied by a gain to give a control current output to the voice coil.

When the profile velocity is larger than the actual velocity, the result of subtracting actual actuator velocity from the selected velocity obtained from the velocity profile is positive, and the actuator is accelerated. When the profile velocity is less than actual velocity, the result of subtracting actual actuator velocity from the selected velocity from the velocity profile is negative, and the actuator is decelerated. The gain is chosen in the closed loop control method so that it is as high as possible yet still within the limits of stability and such that good conformity to the velocity profile is achieved.

The use of a velocity profile that can be developed with respect to any selected servo system operating criteria can be used to minimize the time required for the seek to occur and still reach the destination track with a speed that is neither too large nor too small to effectuate a rapid settling of the transducer head on the destination track at the end of the seek. Specifically, since the control signal is proportional to the difference between the profile velocity and the actual velocity, the transducer head can be caused to rapidly accelerate at the beginning of the seek by providing a profile that calls for large velocities at the beginning of the seek and then rapidly tapering the profile to zero as the destination track is reached.

The amount of deceleration that can be applied to the actuator is a function of many variables including voice coil resistance, file torque constant and power supply voltage. These variables are generally not known for each specific file and as a result, the velocity profile is designed using worst case values to assure that there will always be adequate deceleration capability to stop the actuator upon reaching the target track.

Due to manufacturing tolerances of all the parts that are assembled to form an actuator, it turns out that each transducer head on each arm has a different seek time for a given length of seek. Seek time is the time it takes for a transducer head to go radially from a first tract to target tract. For example, different load beams and flexures have different settling times. Also seek times from a single disc drive can become more or less inconsistent as external conditions such as temperature and vibration change during operation of the disc drive. In order to perform a seek, it is essential that the disc drive controller be able to accurately predict the amount of time the disc takes during a seek to go circumferentially from a first rotational position to a target rotational position. This time is generally referred to as phase difference time. A queue sort algorithm generally determines if this phase difference time is long enough to complete the seek to go from the first track to the target track. If the disc drive controller predicts that the seek can be completed within the phase difference time, and the seek actually takes longer than the phase difference time to complete the seek, then a second revolution of the disc is required to complete the seek. This is referred to as a missed revolution, and this missed revolution can increase the seek time by about 7 to 10 milliseconds, depending on the rotational speed of the disc. The current methods resolve the problem of predicting seek times by maintaining an array of average seek times for each seek length. When a seek is completed, the servo controller returns the actual seek time it took for the seek. The disc drive controller takes this seek time and applies it to the running average of seek. Since not all seeks of a length take the same exact amount of time, a seek adjustment value is added to the seek time to make sure that the seek is not underestimated. This seek adjustment is based on the worst case conditions so that adequate margin is available for both acceleration and deceleration for a given velocity profile. As a result, all of the disc drives operate under worst case conditions at less than an optimal level. Presently, the seek adjustments generally range from about 150 to 300 microseconds.

What is needed is a system that minimizes or reduces seek times. Also needed is a method and apparatus that allows seek times to be optimized and reduced rather than the seek time being associated with the worst case.

SUMMARY OF THE INVENTION

A disc drive includes a base and a disc rotatably attached to the base. The disc drive also includes an actuator assembly rotatably attached to said base and a device for moving the actuator assembly. The actuator assembly includes a transducer head in a transducing relationship with respect to the disc. The disc drive includes a disc drive controller for controlling movement of the actuator during track follow and track seek operations; The disc drive controller has an analyzer to compute a phase difference time when a command is generated to complete a seek. The disc drive controller has a servo controller to control movement of actuator and to monitor the actual seek time to complete the seek. The disc drive controller also has a comparator, coupled to the servo controller and the analyzer to compare the computed phase difference time to the actual seek time, and to issue a command signal when the actual seek time is greater than the computed phase difference time to indicate a missed revolution by the transducer head. The disc drive controller also includes a counter to monitor the number of missed revolutions by the transducer head, upon receiving the command signal from the comparator.

When a seek is performed, the analyzer computes the phase difference time (it is the time the disc takes during a seek to go circumferentially from a first rotational position to a target rotational position), then the servo controller monitors the actual seek time (it is the actual time it takes for the transducer head to go radially from a first track to the target track). Then the comparator compares the computed phase difference time with the actual seek time. If the actual seek time is greater than the phase difference time, then the comparator issues a command signal, indicating a missed revolution by the transducer head. A counter coupled to the comparator monitors the number of missed revolutions upon receiving the command signal from the comparator for a predetermined number of seek operations. At the end of the predetermined number of seek operations, the comparator compares the number of missed revolutions to a predetermined threshold value. If the number of missed revolutions exceeds the predetermined threshold value, then the controller increases the phase difference time by a first predetermined seek adjustment time, and if the number of missed revolutions is equal to zero, then the controller decreases the phase difference time by a second predetermined seek adjustment time. In one embodiment, the controller includes a memory to store the number of missed revolutions. Also disclosed, in another embodiment, is a method of choosing a command to seek based on using a rotational sorting algorithm. In one embodiment the rotational sorting algorithm uses the computed phase difference and seek times of all the seek commands waiting to be executed by the disc drive to choose a next seek command to seek.

Advantageously, the seek time reduction procedure set forth above and the apparatus for implementing the automatic method for reducing the seek times allow for faster seeks and increased throughput in a disc drive. The seek time reduction procedure can be incorporated in microcode and used to control the servo circuitry to implement the invention. The end result will be a reduction in access times to data, and increased throughput of input/output's per second in a disc drive.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
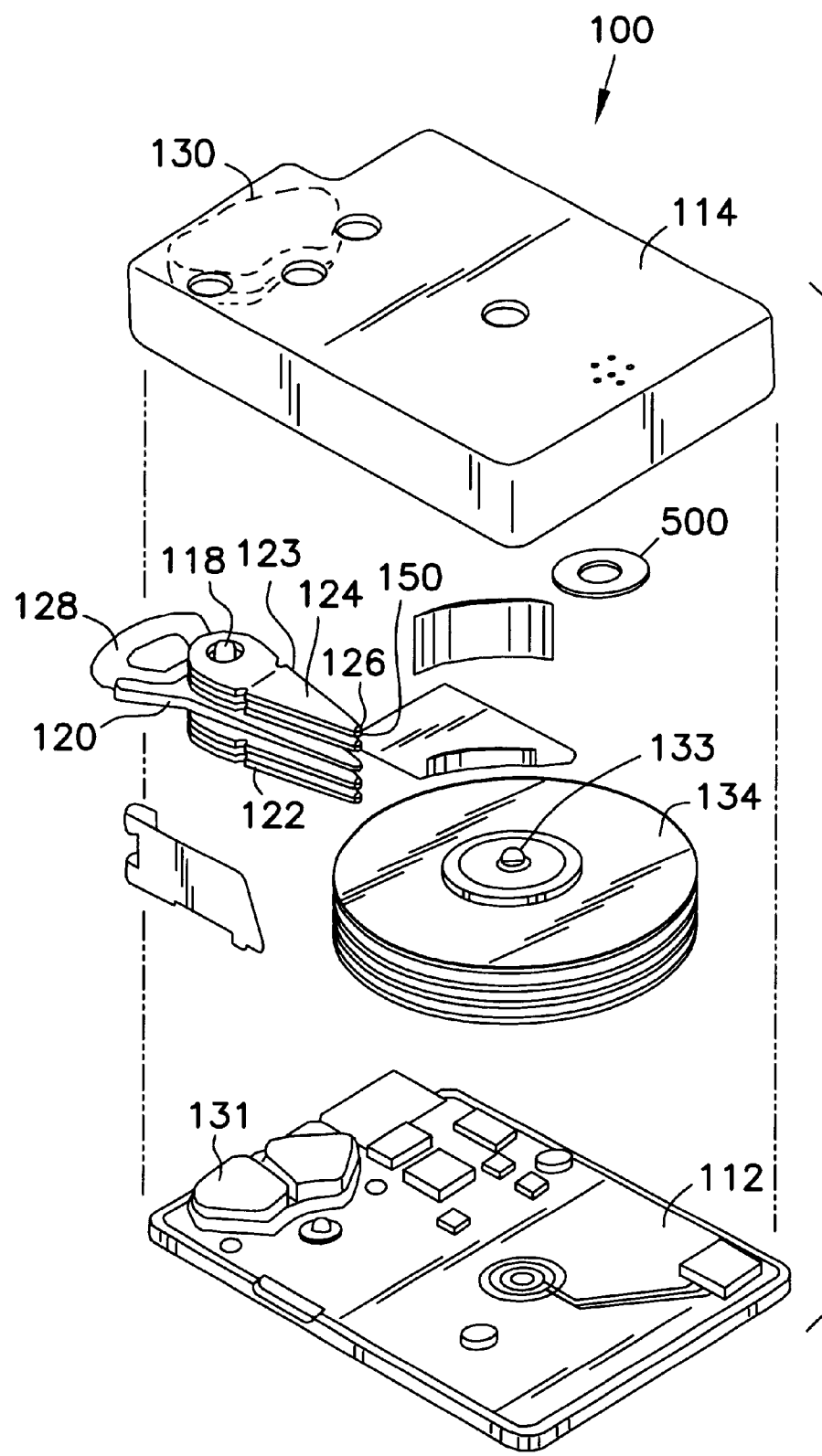
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
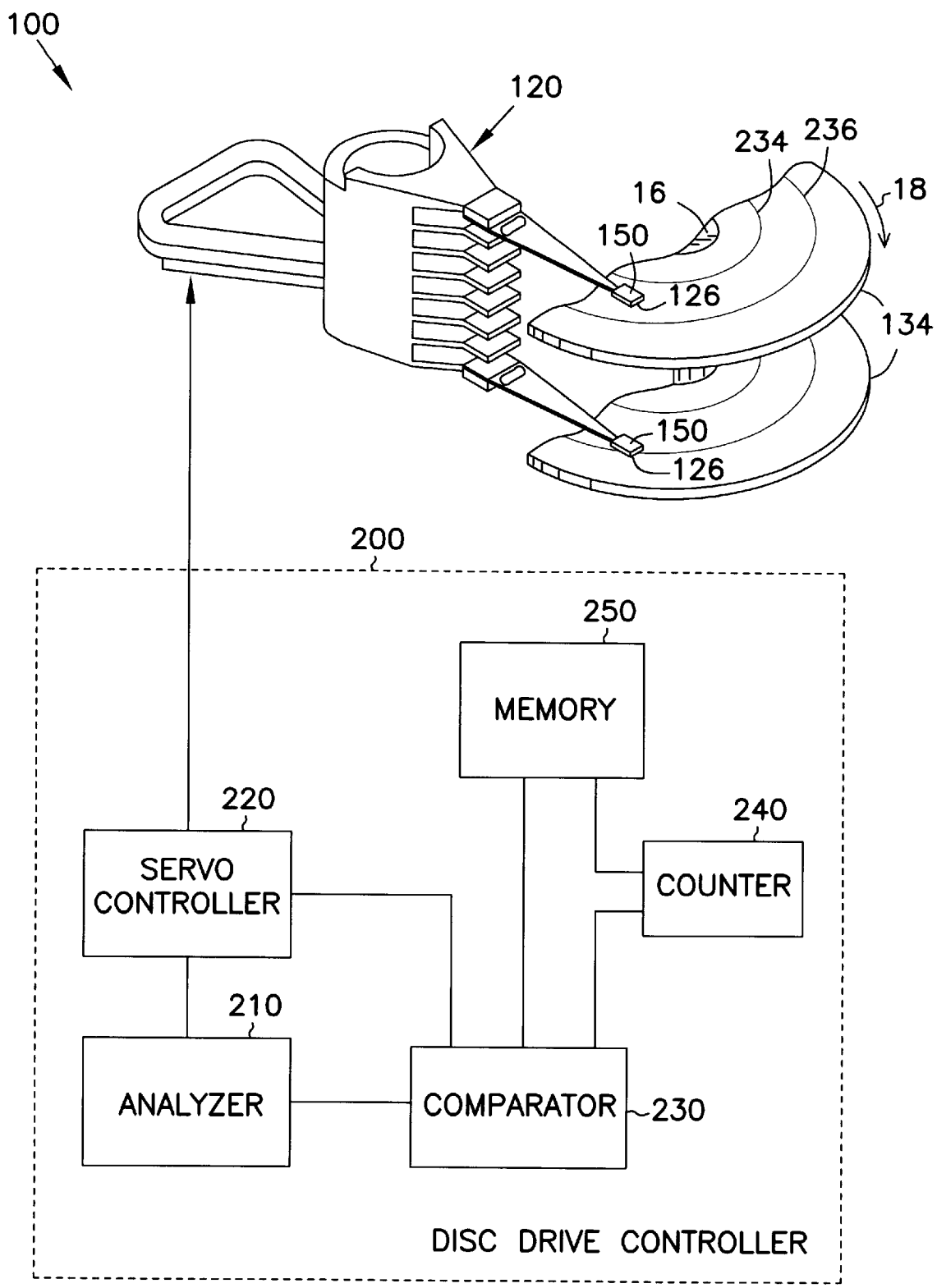
FIG. 2 is a schematic representation of a hard disc drive including portions of the disc drive controller used in optimizing and maximizing the throughput in the disc drive.

FIG. 2 is a schematic representation of a disc drive 100 and further includes selected portions of a disc drive controller 200 and the servo controller 220 used in maximizing the throughput in the disc drive. As shown in FIG. 2, the disc drive 100 incudes a base 112, a disc 134 rotatably attached to the base 112. Servo information is stored on each of the surface of the disc 134. One of said surfaces of the disc has a first track and rotational position 234 and a target track and rotational position 236. An actuator 120 having a transducer head 150 for reading and writing to the first track 234 and target track 236. A disc drive controller 200 coupled to the actuator 120 includes, an analyzer 210 to compute a phase difference time for the disc 134 to partially rotate to position the transducer head 150 from a first track and rotational position 234 to a target track and rotational position 236. The disc drive controller 200 further includes a servo controller 220, which is coupled to the actuator 120 to monitor an actual seek time for the transducer hear 150 to go from the first track 234 to target track 236. The disc drive controller 200 further includes a comparator 230 coupled to the analyzer 210 and the servo controller 222, to compare the computed phase difference time with the actual seek time, and to generate a command signal when the actual seek time exceeds the computed phase difference time. The disc drive controller 200 further includes a counter 240 coupled to the comparator 230, to monitor a number of missed revolutions for a predetermined number of seeks upon receiving the command signal from the comparator 230. The comparator 230 further compares the missed number of revolutions to a threshold value, and increases the computed phase difference time by a first predetermined seek adjustment time when the number of missed revolutions exceeds the threshold value, and decreases the computed phase difference time by a second pre-determined seek adjustment time when the number of missed revolutions is equal to zero. In one embodiment, the disc drive controller 200 includes a memory 250 coupled to the counter 240 and the comparator 230, to store the number of missed revolutions.

In one embodiment, the controller 200 computes the phase difference times and the seek times and uses a rotational position sorting algorithm to decide the next command to seek from a Que of commands waiting to be executed by the disc drive. In another embodiment, the comparator 230 includes a pre-determined number of seeks in the range of about 100 to 200. In another embodiment, the comparator 230 includes a threshold value in the range of about 5 to 10. In another embodiment, the comparator 230 includes a first pre-determined seek adjustment time in the range of about 25 to 100 microseconds. In another embodiment, the comparator 230 includes a second predetermined seek adjustment time in the range of about 25 to 50 microseconds.

Figure 3:
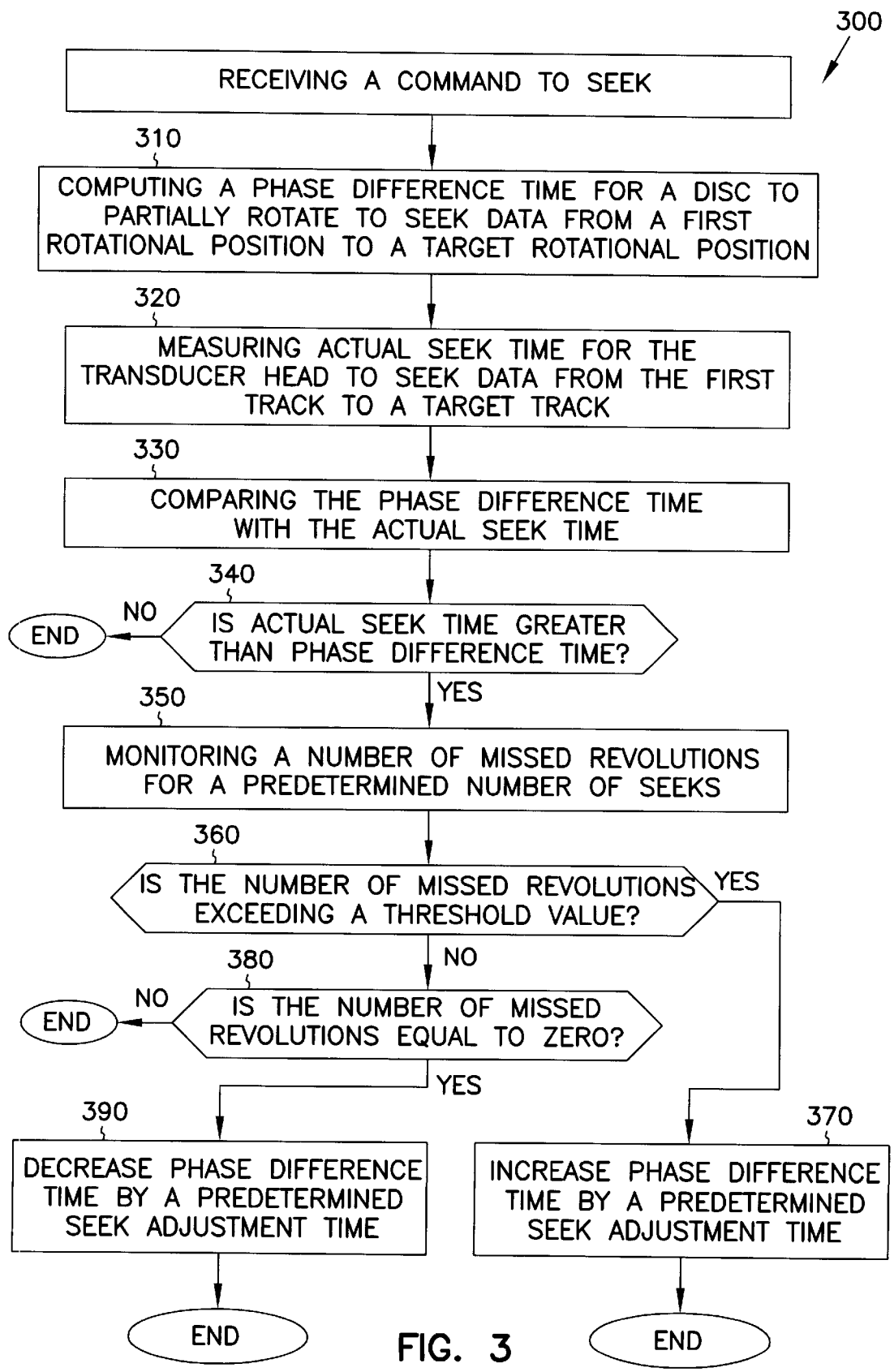
FIG. 3 is a flow diagram of the optimization procedure of the instant invention.

FIG. 3 is a flow diagram of the method of maximizing throughput in a disc drive 300 of the present invention. The first step in the method of maximizing throughput in a disc drive 300 is to compute a phase difference time for a disc to partially rotate to position a transducer head from a first track and rotational position 234 to a target track and rotational position 236 while seeking data upon receiving a command to seek 310, measuring an actual seek time for a transducer head of the disc drive 100 to move from a first track 234 to target track 236 while seeking the data 320, comparing the phase difference time with actual seek time 330, monitoring the number of missed revolutions when the actual seek time exceeds the phase difference time for a pre-determined number of seeks 340 and 350, and then comparing the number of missed revolutions for the pre-determined number of seeks to a threshold value 380, and increasing the phase difference time by a first pre-determined seek adjustment time 370, if the number of missed revolutions exceeds the threshold value 360, and decreasing the phase difference time by a second predetermined seek adjustment time 390, if the number of missed revolutions is equal to zero 380.

In one embodiment, the monitoring step 350, further includes storing the number of missed revolutions for the pre-determined number of seeks. The method also includes a step to choose a next command to seek based on computed phase difference times and seek times.

Advantageously, the seek procedure set forth above and the apparatus for implementing the seek procedure allow for faster seeks. The seek procedure can be incorporated in microcode and used to control the servo circuitry to implement the invention. The information needed can easily be obtained during the manufacture of the disc drive. Obtaining the information needed can be accomplished without deviating substantially from manufacturing techniques close to current manufacturing techniques. The end result will be a reduction in access times to data.

Figure 4:
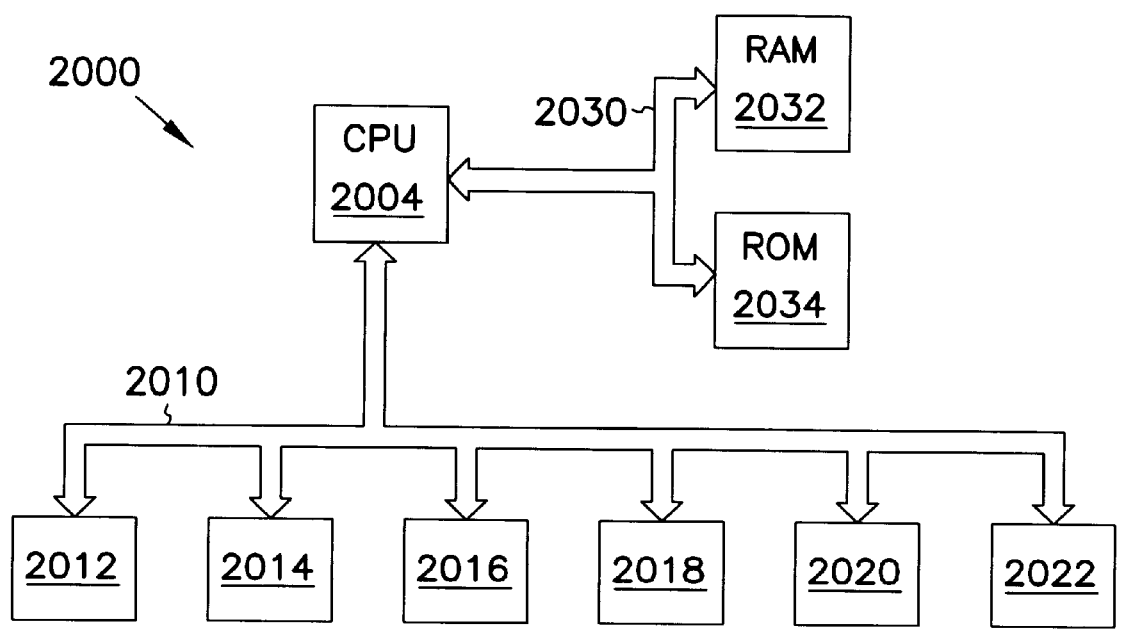
FIG. 4 is a schematic view of a computer system.

FIG. 4 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2000 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

CONCLUSION

In conclusion, a disc drive controller 200 automatically adjusts the phase difference time 370 and 390, to increase the throughput and reduce the number of missed revolutions 360 in disc drive 100. The method includes the steps of computing a phase difference time for a disc to partially rotate to position a transducer head from a first rotational position 234 to a target rotational position 236 while seeking data upon receiving a command to seek 310, measuring an actual seek time for a transducer head of the disc drive 100 to move from a first track 234 to target track 236 while seeking the data 320, comparing the phase difference time with actual seek time 330, monitoring the number of missed revolutions when the actual seek time exceeds the phase difference time for, a pre-determined number of seeks 340 and 350, and then comparing the number of missed revolutions for the predetermined number of seeks to a threshold value 380, and increasing the phase difference time by a first pre-determined seek adjustment time 370, if the number of missed revolutions exceeds the threshold value 360, and decreasing the phase difference time by a second pre-determined seek adjustment time 390, if the number of missed revolutions is equal to zero 380.

The monitoring step 350, further includes storing the number of missed revolutions for the predetermined number of seeks. The method also includes a step to choose a next command to seek based on computed phase difference times and seek times.

Also discussed is disc drive having a base 112, a disc 134 rotatably attached to the base 112. Servo information is stored on each of the surface of the disc 134. One of said surfaces of the disc has a first rotational position 234 and a target rotational position 236. An actuator 120 having a transducer head 150 for reading and writing to the first rotational position 234 and target rotational position 236. A disc drive controller 200 coupled to the actuator 120 includes, an analyzer 210 to compute a phase difference time for the disc 134 to partially rotate to position the transducer head 150 from a first rotational position 234 to a target rotational position 236. The disc drive controller 200 further includes a servo controller 220, which is coupled to the actuator 120 to monitor an actual seek time for the transducer hear 150 to go from the first track 234 to target track 236. The disc drive controller 200 further includes a comparator 230 coupled to the analyzer 210 and the servo controller 222, to compare the computed phase difference time with the actual seek time, and to generate a command signal when the actual seek time exceeds the computed phase difference time. The disc drive controller 200 further includes a counter 240 coupled to the comparator 230, to monitor a number of missed revolutions for a predetermined number of seeks upon receiving the command signal from the comparator 230. The comparator 230 further compares the missed number of revolutions to a threshold value, and increases the computed phase difference time by a first predetermined seek adjustment time when the number of missed revolutions exceeds the threshold value , and decreases the computed phase difference time by a second pre-determined seek adjustment time when the number of missed revolutions is equal to zero. Further the disc drive controller 200 includes a memory 250 coupled to the counter 240 and the comparator 230, to store the number of missed revolutions.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for maximizing throughput in a disc drive, comprising steps of:
   (a) receiving a command to seek data;
   (b) computing a phase difference time for a disc to partially rotate to position a transducer head from a first rotational position on a disc to a target rotational position while seeking the data;
   (c) measuring an actual seek time for the transducer head to move from the first track on the disc to the target track while seeking the data;
   (d) comparing the phase difference time with the actual seek time;
   (e) if the seek time exceeds the phase difference time, issuing a first command signal to indicate a missed revolution; and
   (f) adjusting the phase difference time by a predetermined seek adjustment time upon receiving the command signal.

2. The method of claim 1, wherein the adjusting step (f) further comprises steps of:
   (f)(i) monitoring a number of missed revolutions upon receiving the first command signal for a predetermined number of seeks;
   (f)(ii) comparing the number of missed revolutions to a threshold value at the end of the predetermined number of seeks; and
   (f)(iii) adjusting the phase difference time by a predetermined seek adjustment time, based on the outcome of the comparing step (f)(ii).

3. The method of claim 2, wherein the adjusting step (f) further comprises the steps of:
   (f)(iv) if the number of missed revolutions exceeds the threshold value, increasing the computed phase difference time for a next seek by a first predetermined seek adjustment time; and
   (f)(v) if the number of missed revolutions is equal to a zero, decreasing the computed phase difference time for the next seek by a second predetermined seek adjustment time.

4. The method of claim 1, further comprises the step of (g) storing the number of missed revolutions for the predetermined number of seeks.

5. A method for automatically maximizing throughput in a disc drive, comprising the steps of:
   (a) receiving commands to seek data from a disc drive;
   (b) computing phase difference times for a disc to partially rotate to position a transducer head from a first rotational position on a disc to target rotational position to seek data;
   (c) computing seek times for a head to go from a first track to target tracks to seek data;
   (d) choosing a command to seek data from the disc drive based on the computed phase difference times and the computed seek times;
   (e) measuring an actual seek time for the transducer head to move from the first track on the disc to the target track while seeking the data;
   (f) comparing the phase difference time with the actual seek time;
   (g) if the seek time exceeds the phase difference time, then issuing a first command signal to indicate a missed revolution;
   (h) monitoring a number of missed revolutions upon receiving the first command signal for a predetermined number of seeks; and
   (i) comparing the number of missed revolutions to a threshold value at the end of the predetermined number of seeks, if the number of missed revolutions exceeds the threshold value, then increasing the phase difference time by a first predetermined seek adjustment time, and if the number of missed revolutions is equal to a zero, then decreasing the phase difference time by a second predetermined seek adjustment time.

6. The method of claim 5, wherein the choosing step (d) includes using a rotational positioning sorting algorithm that uses the computed phase difference times and the computed seek times to choose a next command to seek data.

7. A disc drive, comprising:
   a base;
   a disc rotatably attached to the base;
   an actuator for carrying a transducer head in a transducing relation with respect to the disc;
   a disc drive controller, communicatively coupled to the actuator, which further includes:
      an analyzer to compute a phase difference time for the disc to partially rotate to position the transducer head from a first rotational position to a target rotational position upon receiving a command to complete a seek;
      a servo controller, coupled to the actuator, where the servo controller monitors an actual seek time for the transducer head to go from the first track to the target track; and
      a comparator, coupled to the analyzer and the servo controller, compares the computed phase difference time to the actual seek time, and generates a command signal to indicate a missed revolution, when the actual seek time exceeds the computed phase difference time; and
      a counter, coupled to the comparator, wherein the counter monitors the number of missed revolutions upon receiving the command signal for a predetermined number of seeks, and wherein the disc drive controller adjusts the phase difference time by a pre-determined seek adjustment time when the number of missed revolutions exceeds a threshold value.

8. The disc drive of claim 7, wherein the comparator adjusts the phase difference by increasing the phase difference time by a first predetermined seek adjustment time when the number of missed revolutions exceeds the predetermined threshold value, and further decreasing the phase difference time by a second predetermined seek adjustment time when the number of missed revolutions is equal to zero.

9. The disc drive of claim 8, wherein the analyzer further chooses a command to seek data from a set of commands waiting to seek data based on a rotational position sorting algorithm.

10. The disc drive of claim 8, wherein the disc drive controller further includes a memory coupled to the counter to store the number of missed revolutions.

11. The disc drive of claim 8, wherein the predetermined number of seeks is approximately in the range of about 100 to 200.

12. The disc drive of claim 8, wherein the predetermined threshold value is approximately in the range of about 5 to 10.

13. The disc drive of claim 8, wherein the first predetermined seek adjustment time is approximately in the range of about 25 to 100 microseconds.

14. The disc drive of claim 8, wherein the second predetermined seek adjustment time is approximately in the range of about 25 to 50 microseconds.

15. A magnetic disc drive comprising:

a base;

an actuator rotatably attached to the base;

at least one disc rotatably attached to the base, where the actuator carries a head in a transducing relation with respect to the disc; and means for automatically adjusting a phase difference time for the disc to partially rotate to position the head over a target track on the disc to maximize the disc drive throughput.

* * * * *